Patented May 6, 1952

2,595,290

UNITED STATES PATENT OFFICE 2,595,290

WATER PURIFICATION

David H. Quinn, United States Navy, assignor to Quinn Products, Inc., Boston, Mass., a corporation of Massachusetts No Drawing. Application July 25, 1946, Serial No. 686,100

3 Claims. (Cl. 252—177)

(Granted under the act of March 3, 1883, as amended April 30, 1928; 370 O. G. 757)

This invention relates to processes and compositions for water purification.

It has heretofore been proposed to purify water by processes involving mechanical filtration in combination with adsorptive or chemical treatment. In such processes solid particles and bacteria are removed from the water by mechanical filtration and other impurities are removed by the subsequent adsorptive or chemical action. Such processes have often possessed the disadvantages that treatment may be incomplete or that the chemicals employed may be rapidly expended. For example, oligodynamic materials, such as colloidal silver, may be employed to advantage in such processes and yet are effective for only a relatively short time for the reason that they are readily coagulated, particularly when the water is slightly acid.

It is the principal object of the present invention to provide improved processes and compositions for water purification, by use of which even the most polluted waters may be rendered safe and palatable for human consumption, and in which the treatment materials may be used continuously for long periods without replacement or replenishment.

Other objects of the invention are to provide improved water purification processes wherein provision is made for inhibiting growth of vagrant bacteria within the apparatus used by inclusion of a very slightly soluble bactericide that does not affect the effluent from the apparatus; to provide improved compositions for water purification wherein purification is accomplished by combined adsorptive and chemical treatment, the combined actions complementing each other to provide a higher degree of purification than is possible by use of either alone; and to provide improved processes and compositions particularly adapted to medium or small scale operations for providing safe and palatable drinking water in the field.

In accomplishing these and other objects of the present invention, I have provided improved processes and compositions, the details of preferred embodiments of which are hereinafter set forth.

The process of the present invention may be best carried out in two steps, namely, (1) mechanical filtration and (2) combined adsorptive and chemical treatment.

The step of mechanical filtration is desirable in order to remove solid particles and bacteria from the water prior to the step of combined adsorptive and chemical treatment. Mechanical filtration may be accomplished by use of any suitable known filter apparatus, although I prefer to employ ceramic filter tubes of fine porosity, such as those illustrated in my co-pending applications: Serial No. 523,843, filed February 25, 1944, entitled "Water Purifier," now Patent No. 2,434,958, January 27, 1948; Serial No. 666,939, filed May 3, 1946, entitled "Water Filter," now Patent No. 2,566,371, September 4, 1951; or Serial No. 674,405, filed June 5, 1946, entitled "Filter Tube Assembly," now abandoned. The specific apparatus employed does not per se form a part of the present invention; hence it is not shown nor described in detail.

In the step of combined adsorptive and chemical treatment the water is passed through a granular mass comprising an admixture of adsorptive granules, granules of an ion exchange synthetic resin, and granules coated with a bactericide of very low water solubility.

The adsorptive granules act by capillary attraction to remove certain impurities, as, for example, chlorine, bacterial toxins, and others that impart objectionable odors and tastes. Preferably the adsorptive granules are of activated carbon, although I have found the granules of silica gel may also be employed.

The ion exchange granules act chemically on impurities similar to those acted on by the adsorptive granules. The combined action of the adsorptive granules and the ion exchange granules is more effective than the action of either alone, the two complementing each other to remove impurities that might otherwise remain in the effluent. For example, I have found that such bacterial toxins as botulinum, staphylococcus and diphtheria are effectively removed from water by such treatment.

The ion exchange synthetic resins are recognized in the literature as a distinct class of chemical compounds. They are described in detail in a paper by R. J. Meyers entitled "Synthetic Resin Ion Exchangers" which appears in "Advances in Colloidal Science," vol. 1, published by Interscience Publishers, Inc., New York, N. Y., and are also described in "Modern Plastics Encyclopedia" of 1946. They are available commercially under the trade names "Amberlite" and "Duolite" and others, and their utility in water purification has been recognized. I find that any of the known ion exchange synthetic resins may be used advantageously in the compositions and processes of the present invention.

The slightly soluble bactericide, with which certain of the granules are coated, has the function of rendering sterile any water that remains in the apparatus for a protracted period, as, for example, between filtering operations. It might be possible, for example, for bacteria deposited on the mechanical filter to produce spores that penetrate the filter and commence to grow within the apparatus. The bactericide is of such solubility that it goes into solution only very slowly and to a very slight degree, not rapidly enough to affect the effluent nor to be appreciably consumed, but sufficiently to kill any vagrant bacteria that might otherwise grow within the apparatus. Any bactericide carried into the effluent is of such low concentration that it is non-toxic to humans.

I prefer to employ silver chloride as the bactericide just described, although I have found that silver sulfide is also satisfactory. It has been found preferable to apply the bactericide coating to only a few of the granules, rather than coating a large number, because even a very light coating greatly inhibits the adsorptive capacity of the granules, and further the bactericidal action of too light a coating might soon be expended. The granules to which the bactericide is applied act merely as carriers and do not otherwise enter into the reaction; consequently a wide choice of granular materials is available for this purpose. I prefer to employ carbon granules or granules of a siliceous material such as fine sand. If a bactericide of suitable mechanical properties were employed, it could be included in granular form rather than as a surface coating on carrier granules.

The admixture is preferably formed with the different types of granules present in the following ranges by volume:

|  | Per cent |
|---|---|
| Adsorptive granules | 75 to 40 |
| Ion exchange granules | 10 to 30 |
| Bactericide coated granules | 15 to 30 |

The proportions listed are not critical, however, and may be varied rather widely and yet produce a satisfactory combined action. The actual proportions as I prefer to combine them are approximately as follows by volume:

|  | Per cent |
|---|---|
| Adsorptive granules | 75 |
| Ion exchange granules | 10 |
| Bactericide coated granules | 15 |

It has been found that water treated by the two-step process just described is pure and palatable, no matter how polluted it was originally. Such purification is made possible by the increased effectiveness of the combined adsorptive and chemical treatment resulting from use of compositions compounded as described. Since the bactericide, as silver chloride, is coated on separate inactive carriers, there is no coating or film on the active adsorbing granules of carbon and resin which would interfere with adsorbent action and thus reduce the life and efficiency of the sterilizer unit—a factor of highest importance in field uses.

While I have disclosed but certain compositions and processes by which the present invention may be carried out, it is apparent that these are subject to modification without departing from the spirit of the invention. Therefore I do not wish to be limited by the disclosure set forth, but only by the scope of the appended claims.

The invention described herein may be manufactured and used by or for the Government of the United States of America for governmental purposes without the payment of any royalties thereon or therefor.

What is claimed is:

1. A composition for water purification consisting essentially of an admixture of granules of activated carbon 75 to 40 percent by volume, granules of an ion exchange synthetic resin 10 to 30 percent by volume, and granules separate from said carbon and resin granules coated with silver chloride 15 to 30 percent by volume, said silver chloride being in concentration sufficient to destroy bacteria developing in the adsorbing granules but insufficient to produce toxic effects on the water user.

2. A composition for water purification consisting essentially of an admixture of granules of activated carbon approximately 75 percent by volume, granules of an ion exchange synthetic resin approximately 10 percent by volume, and granules of carrier material separate from said carbon and resin granules and coated with silver chloride, said carrier granules forming approximately 15 percent by volume of the composition.

3. A composition for water purification consisting essentially of an admixture of from 75 to 40 per cent by volume of granules of an adsorptive material selected from the group consisting of activated carbon and silica gel, from 10 to 30 per cent by volume of an ion exchange synthetic resin and from 15 to 30 per cent by volume of granules coated with a bactericide of relatively low water solubility selected from the group consisting of silver chloride and silver sulphide, said bactericide coated granules being separate from said adsorptive material and resin granules and said bactericide normally producing a concentration just sufficient to destroy bacteria developing in said adsorptive material and resin granules during periods of non-use of the purification unit.

DAVID H. QUINN.

REFERENCES CITED

The following references are of record in the file of this patent:

UNITED STATES PATENTS

| Number | Name | Date |
|---|---|---|
| 1,081,573 | Boeck | Dec. 16, 1913 |
| 1,557,234 | Bechhold | Oct. 13, 1925 |
| 1,642,089 | Schreier | Sept. 13, 1927 |
| 1,988,246 | Krause | Jan. 15, 1935 |
| 2,008,131 | Dieck et al. | July 16, 1935 |
| 2,055,475 | Behrman | Sept. 29, 1936 |
| 2,066,271 | Irwin | Dec. 29, 1936 |
| 2,206,007 | Liebknecht | June 25, 1940 |
| 2,226,134 | Liebknecht | Dec. 24, 1940 |
| 2,340,110 | D'Alelio | Jan. 25, 1944 |
| 2,396,514 | Kreidl et al. | Mar. 12, 1946 |
| 2,434,190 | Barnes et al. | Jan. 6, 1948 |